(12) United States Patent
Xu et al.

(10) Patent No.: US 11,857,108 B2
(45) Date of Patent: Jan. 2, 2024

(54) FLANGE ASSEMBLY FOR ACHIEVING QUICK REPLACEMENT OF A WOK AND WOK ASSEMBLY DEVICE

(71) Applicant: SHANGHAI AICAN ROBOT (GROUP) CO., LTD., Shanghai (CN)

(72) Inventors: Jinbiao Xu, Shanghai (CN); Guang He, Shanghai (CN); Qing He, Shanghai (CN); Luoya Zeng, Shanghai (CN)

(73) Assignee: SHANGHAI AICAN ROBOT (GROUP) CO., LTD., Shanghai (CN)

( * ) Notice: Subject to any disclaimer, the term of this patent is extended or adjusted under 35 U.S.C. 154(b) by 861 days.

(21) Appl. No.: 16/862,553

(22) Filed: Apr. 29, 2020

(65) Prior Publication Data

US 2020/0253416 A1    Aug. 13, 2020

Related U.S. Application Data

(63) Continuation of application No. PCT/CN2017/117445, filed on Dec. 20, 2017.

(30) Foreign Application Priority Data

Nov. 3, 2017    (CN) .......................... 201711081102.0

(51) Int. Cl.
*H05B 1/02*    (2006.01)
*A47J 36/34*    (2006.01)
(Continued)

(52) U.S. Cl.
CPC ............. *A47J 36/34* (2013.01); *A47J 27/002* (2013.01); *A47J 27/004* (2013.01); *F16L 23/08* (2013.01)

(58) Field of Classification Search
CPC ........ A47J 36/34; A47J 27/002; A47J 27/004; A47J 36/16; A47J 27/00; A47J 36/00; A47J 27/0815; A47J 27/0802; F16L 23/08

See application file for complete search history.

(56) References Cited

U.S. PATENT DOCUMENTS 2,034,868 A  *  3/1936 Henriksen ............ A47G 29/093
                                                    248/500
2,997,199 A  *  8/1961 Reachi ..................... A47G 7/06
                                                    220/630

(Continued)

FOREIGN PATENT DOCUMENTS

| CN | 103462480 A | 12/2013 |
| CN | 204074317 U | 1/2015 |

(Continued)

OTHER PUBLICATIONS

International Search Report of PCT Patent Application No. PCT/CN2017/117445 dated Jun. 29, 2018.

*Primary Examiner* — Amy J. Sterling

(57) ABSTRACT

A flange assembly (1) for achieving quick replacement of a wok comprises a first flange (11), a second flange (12) and at least one resilient piece (13); the first flange (11) is fixedly connected to a bottom portion of the wok (2) and detachably connected to the second flange (12) in a clamped manner, and the second flange (12) is rotatably connected to a driving device (5); the first flange (11) is provided with a first through hole (112) penetrating through an upper surface and a lower surface thereof, the second flange (12) is provided with a first accommodating groove (122), a bottom portion of the first accommodating groove (122) is provided with at least one positioning pin (123), and the at least one resilient piece (13) is arranged on the at least one positioning pin (Continued)

(123) in a sleeving manner. A wok assembly device comprises the flange assembly (1).

20 Claims, 9 Drawing Sheets

(51) Int. Cl.
*A47J 27/00* (2006.01)
*F16L 23/08* (2006.01)

(56) References Cited

U.S. PATENT DOCUMENTS

| | | | | |
|---|---|---|---|---|
| 3,369,691 A * | 2/1968 | Wei | ............................ | A47J 47/14 220/4.27 |
| 4,313,050 A * | 1/1982 | Abenaim | ................ | F24C 15/36 219/432 |
| 4,399,351 A * | 8/1983 | Koff | ...................... | F24C 15/105 219/432 |
| 4,448,186 A * | 5/1984 | Smith | ...................... | A47J 36/36 219/443.1 |
| 7,481,329 B2 * | 1/2009 | Camp, Jr. | ................. | B65F 1/06 220/729 |
| 9,521,919 B1 * | 12/2016 | Reyes | ................ | A47G 23/0225 |
| 9,945,565 B2 * | 4/2018 | Lee | ........................ | A47J 37/108 |
| 2003/0150857 A1 * | 8/2003 | Tsai | ..................... | B65D 51/242 206/508 |
| 2010/0024796 A1 * | 2/2010 | Lee | ......................... | F24C 15/10 126/215 |
| 2016/0116104 A1 * | 4/2016 | Jaggard | ............... | A47J 37/0786 248/165 |
| 2020/0154945 A1 * | 5/2020 | Montoya | ................. | B08B 9/087 |
| 2022/0133089 A1 * | 5/2022 | Burch, II | ............ | A47J 37/0704 126/25 A |

FOREIGN PATENT DOCUMENTS

| | | |
|---|---|---|
| CN | 204232943 U | 4/2015 |
| CN | 104783642 A | 7/2015 |
| CN | 204520282 U | 8/2015 |

* cited by examiner

FLANGE ASSEMBLY FOR ACHIEVING QUICK REPLACEMENT OF A WOK AND WOK ASSEMBLY DEVICE

CROSS REFERENCE TO RELATED APPLICATIONS

The present application is a Continuation Application of PCT Application No. PCT/CN2017/117445 filed on Dec. 20, 2017, which claims the benefit of Chinese Patent Application No. 201711081102.0 filed on Nov. 3, 2017. All the above are hereby incorporated by reference.

FIELD OF THE INVENTION

The invention relates to the technical field of intelligent household appliances, in particular to a flange assembly for achieving quick replacement of a wok and a wok assembly device.

BACKGROUND OF THE INVENTION

At present, a wok of the existing cooking machine is generally connected to a driving device in a rotatable manner through a rotating shaft on a base of the wok, the wok is driven by the driving device to rotate, and therefore the cooking function of the cooking machine is achieved.

In the using process of the cooking machine, the wok has a certain service life, so the wok needs to be replaced with a new one when the wok reaches the service life; however, the wok is directly connected with the driving device through the rotating shaft on the base, so that the wok is inconvenient to disassemble, and the wok cannot be quickly replaced with a new one.

SUMMARY OF THE INVENTION

An embodiment of the present invention aims to provide a flange assembly for achieving quick replacement of a wok and a wok assembly device, which solves the technical problem that the existing wok cannot be quickly replaced with a new one when the service life is reached, and realizes quick replacement of the wok.

In order to solve the technical problem, an embodiment of the present invention provides a flange assembly for achieving quick replacement of a wok which comprises a first flange, a second flange and at least one resilient piece; the first flange is fixedly connected to a bottom portion of the wok and detachably connected to the second flange in a clamped manner, and the second flange is rotatably connected to a driving device; the first flange is provided with a first through hole penetrating through an upper surface and a lower surface of the first flange, the second flange is provided with a first accommodating groove, a bottom portion of the first accommodating groove is provided with at least one positioning pin, and the at least one resilient piece is arranged on the at least one positioning pin in a sleeving manner; when the first flange is connected to the second flange in a clamped manner to quickly install the wok on the driving device, one end of each resilient piece penetrates through the first through hole and abuts against the bottom portion of the wok, and the other end of each resilient piece abuts against the bottom portion of the first accommodating groove; and when the wok is to be replaced with a new one, the first flange can be quickly detached from the second flange to separate the wok from the driving device.

Preferably, at least one clamping pin is arranged on a side face of the first flange, at least one bayonet is arranged on a side face of the second flange, and the at least one clamping pin is connected with the at least one bayonet in a clamped manner.

Preferably, at least one bayonet is formed in a side face of the first flange, at least one clamping pin is arranged on a side face of the second flange, and the at least one clamping pin is connected with the at least one bayonet in a clamped manner.

Preferably, each bayonet is U-shaped; one end of each bayonet is a sealing port, the other end of each bayonet is an open port, and a certain vertical distance is kept between the sealing port and the open port of each bayonet; the clamping pin enters the bayonet from the open port of the bayonet and then is clamped on the sealing port of the bayonet along with the rotation of the wok.

Preferably, the at least one clamping pin is 3, 4 or 5 in number and arranged circumferentially on a side face of the first/second flange, the at least one bayonet is 3, 4 or 5 in number and arranged circumferentially on a side face of the second/first flange, the at least one clamping pin and at least one bayonet are in one-to-one correspondence.

Preferably, the flange assembly further comprises a pressing spring inner cover and a pressing spring outer cover; the pressing spring outer cover is fixedly connected to the first accommodating groove of the second flange and provided with a second through hole penetrating through an upper surface and a lower surface of the pressing spring outer cover, the pressing spring outer cover is arranged on the pressing spring inner cover through the second through hole in a sleeving manner, and the pressing spring inner cover cannot separate from the pressing spring outer cover; when the first flange is connected to the second flange in a clamped manner, each resilient piece applies an upward supporting force to the pressing spring inner cover, so that the pressing spring inner cover abuts against the bottom portion of the wok to support the wok.

Preferably, an outer wall of the pressing spring inner cover is provided with a first annular flange, the pressing spring inner cover is further provided with a second accommodating groove, the pressing spring outer cover comprises a base and a first boss arranged on the base, and an inner wall of the second through hole is provided with a second annular flange; the pressing spring inner cover is arranged on the at least one first resilient piece through the second accommodating groove in a covering manner, the first annular flange is disposed opposite to and below the second annular flange, and the pressing spring outer cover is fixedly connected to a bottom portion of the first accommodating groove through the base; when the first flange is connected to the second flange in a clamped manner, one end of each first resilient piece abuts against the bottom portion of the wok via a bottom portion of the second accommodating groove.

Preferably, the flange assembly further comprises a guide piece, the guide piece is provided with a third accommodating groove, and the guide piece is arranged on and connected to the pressing spring inner cover through the third accommodating groove in a sleeving manner; a side wall of the guide piece contacts with a side wall of the first through hole to guide the pressing spring inner cover into the first through hole.

In order to solve the technical problem, an embodiment of the present invention provides a wok assembly device which comprises a wok, a heating device, a bracket and a driving device, the heating device comprises an inner container, an outer shell and the flange assembly; the outer shell is fixedly connected to the bracket, the inner container is contained in the outer shell, and the wok is arranged on the inner container; the first flange is connected to a bottom portion of the wok, sequentially penetrates through a bottom portion of the inner container and a bottom portion of the outer shell and is detachably connected to the second flange; and the driving device is fixedly connected to the bracket.

Preferably, at least one clamping pin is arranged on a side face of the first flange, at least one bayonet is arranged on a side face of the second flange, and the at least one clamping pin is connected with the at least one bayonet in a clamped manner.

Preferably, at least one bayonet is formed in a side face of the first flange, at least one clamping pin is arranged on a side face of the second flange, and the at least one clamping pin is connected with the at least one bayonet in a clamped manner.

Preferably, the bayonet is U-shaped; one end of each bayonet is a sealing port, the other end of each bayonet is an open port, and a certain vertical distance is kept between the sealing port and the open port of each bayonet; the clamping pin enters the bayonet from the open port of the bayonet and then is clamped on the sealing port of the bayonet along with the rotation of the wok.

Preferably, the flange assembly further comprises at least one first resilient piece, the first flange is provided with a first through hole penetrating through an upper surface and a lower surface of the first flange, the second flange is provided with a first accommodating groove, a bottom portion of the first accommodating groove is provided with at least one positioning pin, and the at least one first resilient piece is arranged on the positioning pin in a sleeving manner; when the clamping pin is connected with the at least one bayonet in a clamped manner, one end of the each first resilient piece penetrates through the first through hole and abuts against the bottom portion of the wok, and the other end of the each first resilient piece abuts against a bottom portion of the first accommodating groove.

Preferably, the flange assembly further comprises a pressing spring inner cover and a pressing spring outer cover, an outer wall of the pressing spring inner cover is provided with a first annular flange, the pressing spring inner cover is further provided with a second accommodating groove, the pressing spring outer cover comprises a base and a first boss arranged on the base, the pressing spring outer cover is provided with a second through hole penetrating through an upper surface and a lower surface of the pressing spring outer cover, and an inner wall of the second through hole is provided with a second annular flange; the pressing spring inner cover is arranged on the at least one first resilient piece through the second accommodating groove in a covering manner, the pressing spring outer cover is arranged on the pressing spring inner cover through the second through hole in a sleeving manner, the first annular flange is disposed opposite to the second annular flange and below the second annular flange, and the pressing spring outer cover is fixedly connected to a bottom portion of the first accommodating groove through the base; when the at least one clamping pin is connected with the at least one bayonet in a clamped manner, one end of the first resilient piece abuts against the bottom portion of the wok via a bottom portion of the second accommodating groove.

Preferably, the flange assembly further comprises a guide piece, the guide piece is provided with a third accommodating groove, and the guide piece is arranged on and connected to the pressing spring inner cover through the third accommodating groove in a sleeving manner; a side wall of the guide piece contacts with a side wall of the first through hole to guide the pressing spring inner cover into the first through hole.

Preferably, the wok assembly device further comprises a resilient supporting device, and the resilient supporting device comprises an annular base and a plurality of resilient supporting structures evenly distributed on the annular base; the annular base is in contact with a top portion of the inner container, and the annular base is provided with at least one mounting portion, and the annular base is fixedly connected to the bracket through the at least one mounting portion; each of the plurality of resilient supporting structure comprises a mounting seat, a pressing piece, a top shaft, a top bead and a second resilient piece, a third through hole is formed in the mounting seat, one end of the top shaft is fixedly connected to the pressing piece, the other end of the top shaft penetrates through the third through hole, a second boss is arranged on a side face of the top shaft, the second resilient piece is arranged on the top shaft in a sleeving manner, one end of the second resilient piece abuts against the pressing piece, the other end of the second resilient piece abuts against one end of the second boss, the other end of the second boss abuts against the mounting seat, the pressing piece is fixedly connected to the mounting seat, the top bead is fixedly connected to the other end of the top shaft, and each of the plurality of resilient supporting structure is fixedly connected to the annular base through the mounting seat; when the wok is placed on the heating device, the top bead abuts against an outer side wall of the wok.

Preferably, the wok assembly device further comprises a protective shell, and the wok, the heating device, the bracket and the driving device are all contained in the protective shell; the protective shell comprises an upper protective shell and a lower protective shell, the bracket comprises a bracket body and at least one connecting arm arranged on the bracket body, a first inserting part is arranged at an upper portion of each connecting arm, at least one first inserting opening is formed in the upper protective shell, and each first inserting opening is inserted by the first inserting part; a second inserting part is arranged at a lower portion of each connecting arm, at least one second inserting opening is formed in the lower protective shell, and each second inserting opening is inserted by the second inserting opening.

Preferably, the bracket further comprises a supporting seat, and the outer shell is fixedly connected to the bracket through the supporting seat; a fourth through hole is formed in the supporting seat, and the first flange sequentially penetrates through the bottom portion of the inner container, the bottom portion of the outer shell and the fourth through hole.

Preferably, the at least one clamping pin is 3, 4 or 5 in number and arranged circumferentially on a side face of the first/second flange, the at least one bayonet is 3, 4 or 5 in number and arranged circumferentially on a side face of the second/first flange, the at least one clamping pin and at least one bayonet are in one-to-one correspondence.

Preferably, the plurality of resilient supporting structures are 3, 4 or 5 in number and arranged circumferentially on a side face of the annular base.

Preferably, a flanging structure is arranged on a wok opening of the wok, and the flanging structure is an arc structure or a right-angle structure; the upper protective shell and the lower protective shell are connected to the bracket in an inserted manner, so that the bottom portion of the upper protective shell and the top portion of the lower protective shell are attached together, and meanwhile, a sealed space is formed inside the wok assembly device by combination the embedding and matching of the wok.

Preferably, each connecting arm is V-shaped, the first inserting part and the second inserting part are respectively provided on two branchs of the each connecting arm; the at least one connecting arm is 2 in number and arranged on the bracket body in a circumferential manner; the bracket body and the at least one connecting arm are integrally formed.

The embodiment of the present invention provides a wok assembly device which comprises a flange assembly, a wok, a heating device, a bracket and a driving device, the heating device comprises an inner container and an outer shell, the flange assembly comprises a first flange and a second flange; the outer shell is fixedly connected to the bracket, the inner container is contained in the outer shell, and the wok is arranged on the inner container; the first flange is connected to a bottom portion of the wok, sequentially penetrates through a bottom portion of the inner container and a bottom portion of the outer shell and is detachably connected to the second flange; the second flange is rotatably connected to the driving device; and the driving device is fixedly connected to the bracket. When the wok is to be replaced with a new one, the first flange and the second flange can be quickly detached from each other to separate the wok from the driving device, so that the wok can be quickly detached from the driving device; and then the first flange and the second flange can be quickly connected to each other to install a new wok on the driving device, so that quick replacement of the wok is achieved.

1, a flange assembly; 11, a first flange; 111, a clamping pin; 112, a first through hole; 113, a mounting hole; 12, a second flange; 121, a bayonet; 122, a first accommodating groove; 1221, a fifth through hole; 123, a positioning pin; 124, a connecting hole; 13, an resilient piece; 14, a pressing spring inner cover; 141, a first annular flange; 142, a second accommodating groove; 143, a seventh through hole; 15, a pressing spring outer cover; 151, a base; 1511, a sixth through hole; 152, a first boss; 153, a second through hole; 154, a second annular flange; 16, a guide piece; 161, a third accommodating groove; 1611, an eighth through hole; 2, a wok; 21, a stud; 22, a flanging structure; 3, a heating device; 31, an inner container; 311, a top portion of the inner container; 32, a outer shell; 4, a bracket; 41, a bracket body; 42, a connecting arm; 421, a first inserting part; 422, a second inserting part; 43, a supporting seat; 431, a fourth through hole; 432, a mounting support; 5, a driving device; 6, a resilient supporting device; 61, an annular base; 611, an mounting portion; 62, an resilient supporting structure; 621, a mounting seat; 6211, a third through hole; 622, a pressing piece; 623, top shaft; 6231, a second boss; 624, top bead; 625, a second resilient piece; 7, a protective shell; 71, an upper protective shell; 711, a first inserting opening; 72, a lower protective shell; 722, a second inserting opening; 8, a first rotating shaft; 9, a second rotating shaft.

DETAILED DESCRIPTION OF ILLUSTRATED EMBODIMENTS

Specific embodiments of the present invention are described in further detail below in connection with the accompanying drawings and examples. The following examples serve to illustrate the invention but are not intended to limit the scope of the present invention.

Figure 1:
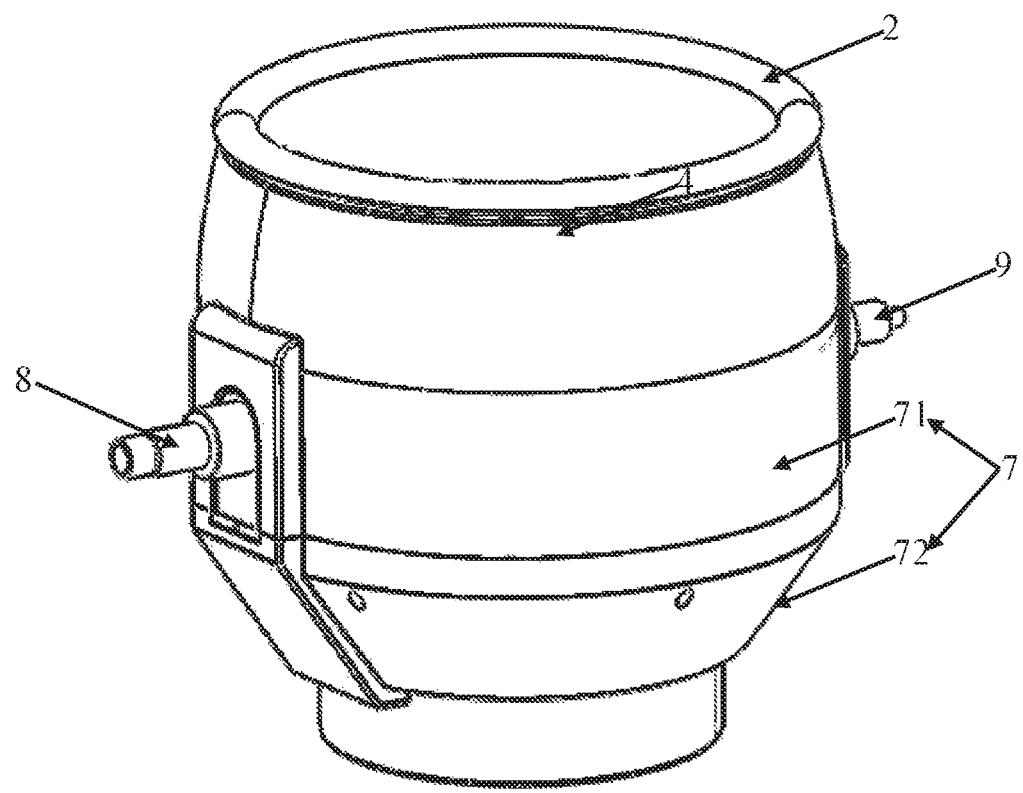
FIG. 1 is a schematic structural view of a wok assembly device in an embodiment of the present invention.
Figure 2:
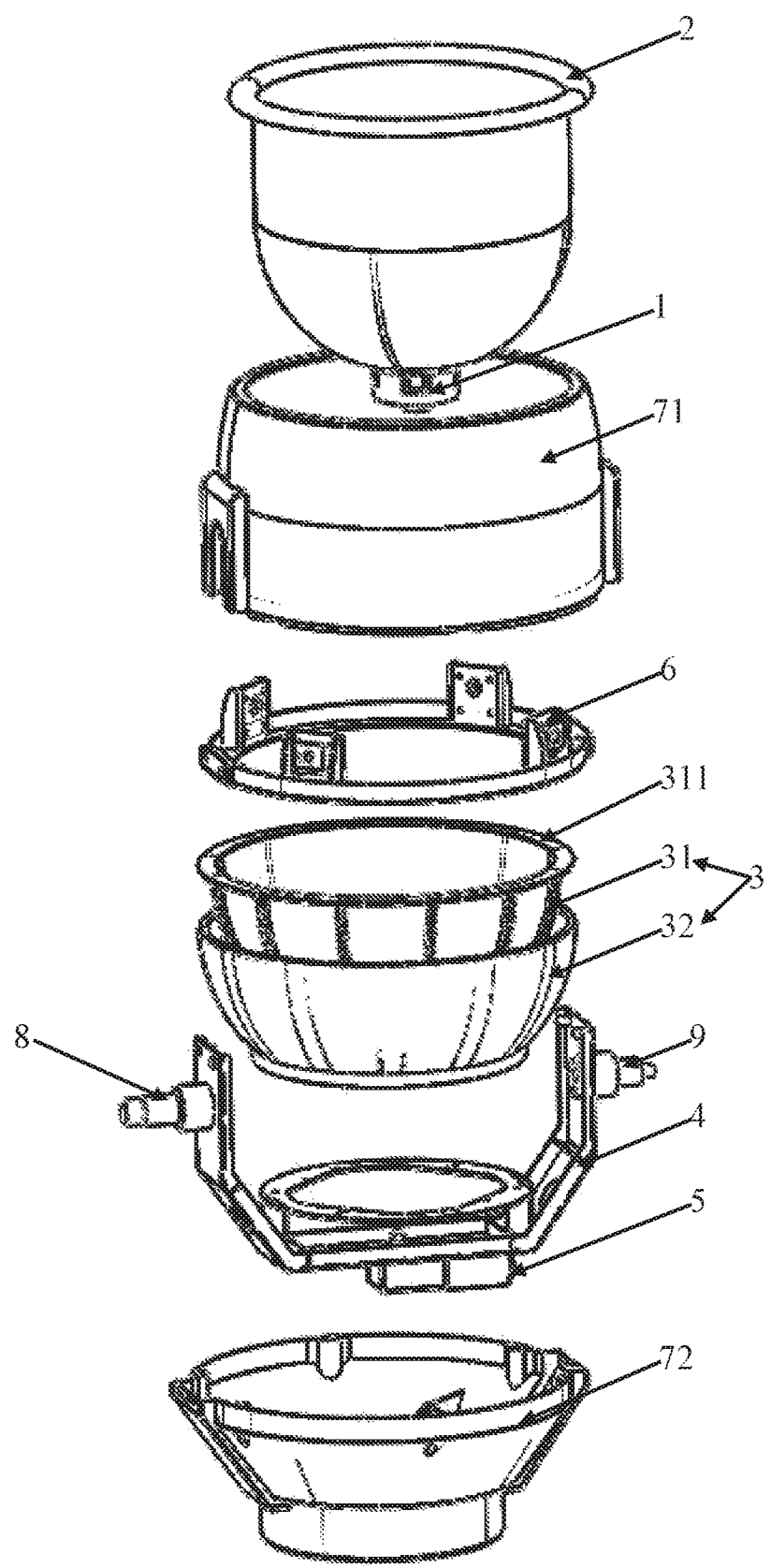
FIG. 2 is an exploded view of the wok assembly device in an embodiment of the present invention.
Figure 3:
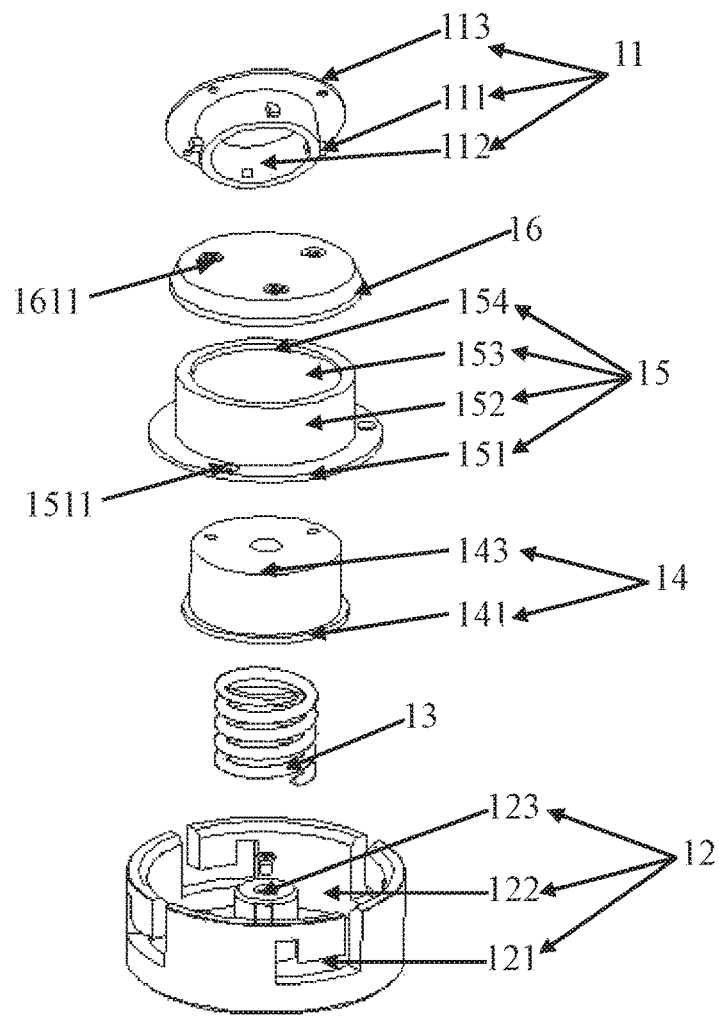
FIG. 3 is an exploded view of a flange assembly in an embodiment of the present invention.

Referring to FIGS. 1 and 2, a wok assembly device in a preferred embodiment of the present invention includes a flange assembly 1, a wok 2, a heating device 3, a bracket 4 and a driving device 5, the heating device 3 includes an inner container 31 and an outer shell 32, and the flange assembly 1 includes a first flange 11 and a second flange 12; the outer shell 32 is fixedly connected to the bracket 4, the inner container 31 is contained in the outer shell 32, and the wok 2 is arranged on the inner container 31; the first flange 11 is connected to a bottom portion of the wok 2, sequentially penetrates through a bottom portion of the inner container 31 and a bottom portion of the outer shell 32 and is detachably connected to the second flange 12; the second flange 12 is rotatably connected to the driving device 5; and the driving device 5 is fixedly connected to the bracket 4.

In the embodiment of the present invention, when the wok 2 is to be replaced with a new one, the first flange 11 and the second flange 12 can be quickly detached from each other to separate the wok 2 from the driving device 5, so that the wok 2 can be quickly detached from the driving device 5; and then the first flange 11 and the second flange 12 can be quickly connected to each other to install a new wok 2 on the driving device 5, so that quick replacement of the wok 2 is achieved.

As shown in FIGS. 2-5, in order to rationalize the structure and enable the first flange 11 to be detachably connected to the second flange 12, at least one clamping pin 111 (or bayonet 121) is arranged on a side face of the first flange 11 in the embodiment, at least one bayonet 121 (or clamping pin 111) is arranged on a side face of the second flange 12, and the at least one clamping pin 111 is connected with the at least one bayonet 121 in a clamped manner Through clamping connection of the clamping pin 111 and the bayonet 121, the first flange (11) and the second flange (12) can be quickly detached from each other to separate wok (2) from the driving device (5) or can be quickly connected to install a new wok, so that quick replacement of the wok is achieved.

As shown in FIGS. 2-5, in order to improve the firmness and convenience of the clamping connection between the clamping pin 111 and the bayonet 121, the bayonet 121 in the embodiment is U-shaped; one end of the bayonet 121 is a sealing port, the other end of the bayonet 121 is an open port, and a certain vertical distance is kept between the sealing port and the open port of the bayonet 121; the clamping pin 111 enters the bayonet 121 from the open port of the bayonet 121 and is clamped on the sealing port of the bayonet 121, so that the clamping pin 111 is firmly clamped on the bayonet 121, and meanwhile, the convenience of clamping connection of the clamping pin 111 and the bayonet 121 is improved, and thereby the replacement speed of the wok 2 is improved.

In the embodiment of the present invention, the shape of the clamping pin 111 can be set according to actual use requirements, such as a cuboid, a cylinder, or any other shape or the like. In order to enable the clamping pin 111 to be in sufficient contact with the sealing port of the bayonet 121 and improve the firmness of the clamping connection of the clamping pin 111 and the bayonet 121, preferably, the clamping pin 111 in the embodiment is in a cuboid shape.

In an embodiment of the present invention, the number of the clamping pins 111 can be set according to actual use requirements, such as 3, 4 or 5, etc. In order to ensure that the first flange 11 can be firmly clamped on the second flange 12 and simplify the structure to reduce the cost, preferably, the number of the clamping pins 111 in the embodiment is four, correspondingly, the number of the bayonets 121 is four, and the clamping pins 111 and the bayonets 121 are in one-to-one correspondence.

Furthermore, in an embodiment of the present invention, it should be noted that when the first flange 11 is clamped with the second flange 12, in order to uniformly stress the side face of the first flange 11 and ensure that each position of the side face of the first flange 11 is firmly clamped with the second flange 12, the four clamping pins 111 (or bayonets 121) in the embodiment are arranged circumferentially on the side face of the first flange 11, and correspondingly, the four bayonets 121 (or clamping pins 111) are arranged circumferentially on the side face of the second flange 12.

As shown in FIGS. 2-5, the flange assembly 1 in the embodiment further includes at least one resilient piece 13 for providing upward supporting force for the wok 2 when the clamping pin 111 is clamped with the bayonet 121, the first flange 11 is provided with a first through hole 112 penetrating through an upper surface and a lower surface of the first flange 11, the second flange 12 is provided with a first accommodating groove 122 at a bottom portion of which at least one positioning pin 123 is arranged, and the resilient piece 13 is arranged on the positioning pin 123 in a sleeving manner; when the clamping pin 111 is connected with the bayonet 121 in a clamped manner, one end of the resilient piece 13 penetrates through the first through hole 112 and abuts against the bottom portion of the wok 2, and the other end of the resilient piece 13 abuts against a bottom of the first accommodating groove 122. When the clamping pin 111 is connected with the bayonet 121 in a clamped manner, the resilient piece 13 is tightly pressed by the bottom of the wok 2, so that after the clamping connection of the clamping pin 111 and the bayonet 121 is completed, the resilient piece 13 generates an upward supporting force on the wok 2 due to a reaction force, and therefore the clamping pin 111 is firmly connected to the bayonet 121 in a clamped manner.

In addition, in the embodiment of the present invention, it should be noted that at this case the clamping pin 111 (or the bayonet 121) in the embodiment is arranged on the outer side wall of the first through hole 112, and the bayonet 121 (or the clamping pin 111) is arranged on the side wall of the first accommodating groove 122.

In an embodiment of the present invention, the number of the resilient pieces 13 can be set according to actual use requirements, such as 2, 3, 4, etc. In order to improve the upward supporting force of the resilient pieces 13 on the bottom portion of the wok 2 and improve the locking force when the clamping pin 111 is clamped with the bayonet 121, preferably, the number of the resilient pieces 13 in the embodiment is three, correspondingly, the number of the positioning pins 123 is three, and the resilient pieces 13 and the positioning pins 123 are in one-to-one correspondence.

In addition, in an embodiment of the present invention, it should be noted that the resilient piece 13 is a spring, and of course, the resilient piece 13 may also be made of other resilient materials as long as it has enough upward supporting force for the wok 2, which is not described herein for further details.

As shown in FIGS. 2-7, in order to further improve the upward supporting force of the resilient piece 13 to the bottom portion of the wok 2 and further improve the locking force when the clamping pin 111 is clamped with the bayonet 121, the flange assembly 1 in the embodiment further includes a pressing spring inner cover 14 and a pressing spring outer cover 15, the outer wall of the pressing spring inner cover 14 is provided with a first annular flange 141, the pressing spring inner cover 14 is further provided with a second accommodating groove 142, the pressing spring outer cover 15 includes a base 151 and a first boss 152 arranged on the base 151, a second through hole 153 penetrating through the upper surface and the lower surface of the pressing spring outer cover 15 is formed in the pressing spring outer cover 15, the pressing spring outer cover 15 is provided with a second through hole 153 penetrating through an upper surface and a lower surface of the pressing spring outer cover 15, and the inner wall of the second through hole 153 is provided with a second annular flange 154; the pressing spring inner cover 14 is arranged on the resilient piece 13 through the second accommodating groove 142 in a covering manner, the pressing spring outer cover 15 is arranged on the pressing spring inner cover 14 through the second through hole 153 in a sleeving manner, the first annular flange 141 is disposed opposite to the second annular flange 154 and below the second annular flange 154, and the pressing spring outer cover 15 is fixedly connected to the bottom portion of the first accommodating groove 122 through the base 151; when the clamping pin 111 is connected with the bayonet 121 in a clamped manner, one end of the resilient piece 13 abuts against the bottom portion of the wok 2 through the bottom of the second accommodating groove 142. The resilient piece 13 applies an upward supporting force to the pressing spring inner cover 14, so that the pressing spring inner cover 14 abuts against the bottom portion of the wok 2 and generates upward supporting force to the bottom portion of the wok 2, and due to the fact that the contact area between the pressing spring inner cover 14 and the bottom of the wok 2 is larger, the upward supporting force generated by the pressing spring inner cover 14 to the bottom portion of the wok 2 is relatively larger, thereby the locking force generated when the clamping pin 111 is clamped with the bayonet 121 is improved.

In addition, in an embodiment of the present invention, in order to prevent the pressing spring inner cover 14 from escaping from the pressing spring outer cover 15, the first annular flange 141 is disposed opposite to and below the second annular flange 154; meanwhile, the upward supporting force of the pressing spring inner cover 14 to the bottom portion of the wok 2 can also be improved through clamping connection of the first annular flange 141 and the second annular flange 154, and therefore the locking force generated when the clamping pin 111 is clamped with the bayonet 121 is further improved.

As shown in FIGS. 2-7, in order to rationalize the structure and fixedly connect the pressing spring outer cover 15 to the bottom portion of the first accommodating groove 122 through the base 151, the bottom portion of the base 151 in the embodiment is provided with a fifth through hole 1511 penetrating through the upper surface and the lower surface of the bottom portion of the base 151, the bottom portion of the first accommodating groove 122 is provided with a sixth through hole 1221, and the fifth through hole 1511 is connected to the sixth through hole 1221 through a first screw.

As shown in FIGS. 2-8, in order to guide the pressing spring inner cover 14 into the first through hole 112 of the first flange 11 and avoid eccentricity when the first flange 11 is clamped with the second flange 12, the flange assembly 1 in the embodiment further includes a guide piece 16, the guide piece 16 is provided with a third accommodating groove 161 through which the guide piece 16 is arranged on and connected to the pressing spring inner cover 14 in a sleeving manner. The side wall of the guide piece 16 contacts with the side wall of the first through hole 112 to guide the pressing spring inner cover 14 into the first through hole 112 of the first flange 11, and therefore eccentricity generated when the first flange 11 is clamped with the second flange 12 is avoided.

As shown in FIGS. 2-8, in order to reduce the frictional force when the side wall of the guide piece 16 contacts with the side wall of the first through hole 112, the upper portion of the guide piece 16 in the embodiment has a conical frustum shape to reduce the contact area between the side wall of the guide piece 16 and the side wall of the first through hole 112, thereby reducing the friction force when the guide piece 16 enters the first through hole 112.

As shown in FIGS. 2-8, in order to rationalize the structure and realize that the guide piece 16 is connected to the pressing spring inner cover 14 through the third accommodating groove 161 in a sleeving manner, the pressing spring inner cover 14 is provided with a seventh through hole 143, the bottom portion of the third accommodating groove 161 is provided with an eighth through hole 1611 penetrating through the bottom portion of the third accommodating groove 161, and the eighth through hole 1611 is connected to the seventh through hole 143 through a second screw.

As shown in FIGS. 2, 9, 10 and 11, in order to avoid eccentricity of the wok 2 when the wok 2 is arranged on the inner container 31 and avoid influence on rotation of the wok 2, the wok assembly device in the embodiment further includes an resilient supporting device 6, the resilient supporting device 6 includes an annular base 61 and a plurality of resilient supporting structures 62 evenly distributed on the annular base 61; the annular base 61 is in contact with a top portion of the inner container 31 and provided with at least one mounting portion 611 through which the annular base 61 is fixedly connected to the bracket 4. Each of the resilient supporting structures 62 includes a mounting seat 621, a pressing piece 622, a toptop shaft 623, a top bead 624 and a second resilient piece 625, a third through hole 6211 is formed in the mounting seat 621, one end of the top shaft 623 is fixedly connected to the pressing piece 622, the other end of the top shaft 623 penetrates through the third through hole 6211, and a second boss 6231 is arranged on the side face of the top shaft 623; the second resilient piece 625 is arranged on the top shaft 623 in a sleeving manner, one end of the second resilient piece 625 abuts against the pressing piece 622, the other end of the second resilient piece 625 abuts against one end of the second boss 6231, the other end of the second boss 6231 abuts against the mounting seat 621, the pressing piece 622 is fixedly connected to the mounting seat 621, the top bead 624 is fixedly connected to the other end of the top shaft 623, and each of the resilient supporting structures 62 is fixedly connected to the annular base 61 through the mounting seat 621; when the wok 2 is placed on the heating device 3, the top bead 624 abuts against the outer side wall of the wok 2. When the wok 2 is placed on the heating device 3, the outer side wall of the wok 2 extrudes the top bead 624 of each of the plurality of evenly-distributed resilient supporting structures 62, so that each second resilient piece 625 is compressed; after the wok 2 is placed, the reaction force of each second resilient piece 625 acts on the outer side wall of the wok 2 through the top bead 624 of each of the plurality of evenly-distributed resilient supporting structures 62 to adjust the position of the wok 2 and automatically correct the eccentricity of the wok 2, so that the driving device 5 can drive the wok 2 to stably rotate.

In an embodiment of the present invention, the number of the resilient supporting structures 62 may be set according to actual use requirements, such as 3, 4 or 5, etc. In order to improve the centering effect of the resilient supporting structures 62 on the wok 2 and automatically correct the eccentricity of the wok 2, the number of the resilient supporting structures 62 in the embodiment is four, and the four resilient supporting structures 62 are arranged on the annular base 61 in a circumferential manner.

Figure 12:
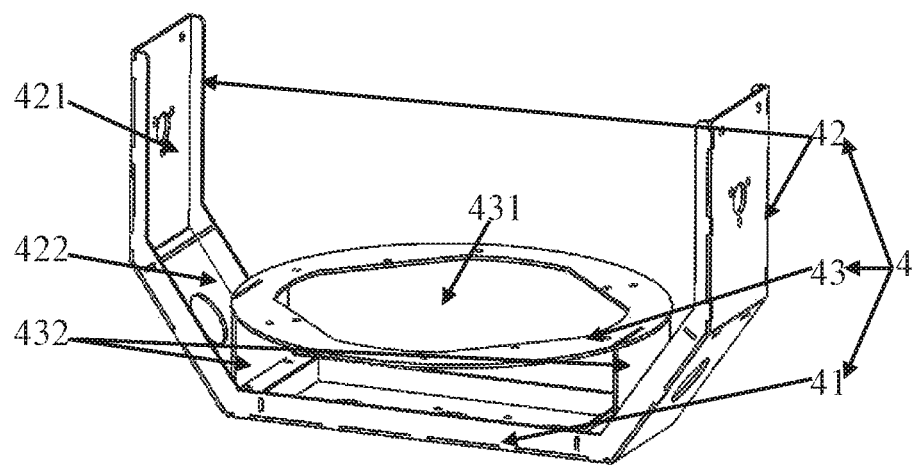
FIG. 12 is a schematic structural view of a bracket in an embodiment of the present invention.
Figure 13:
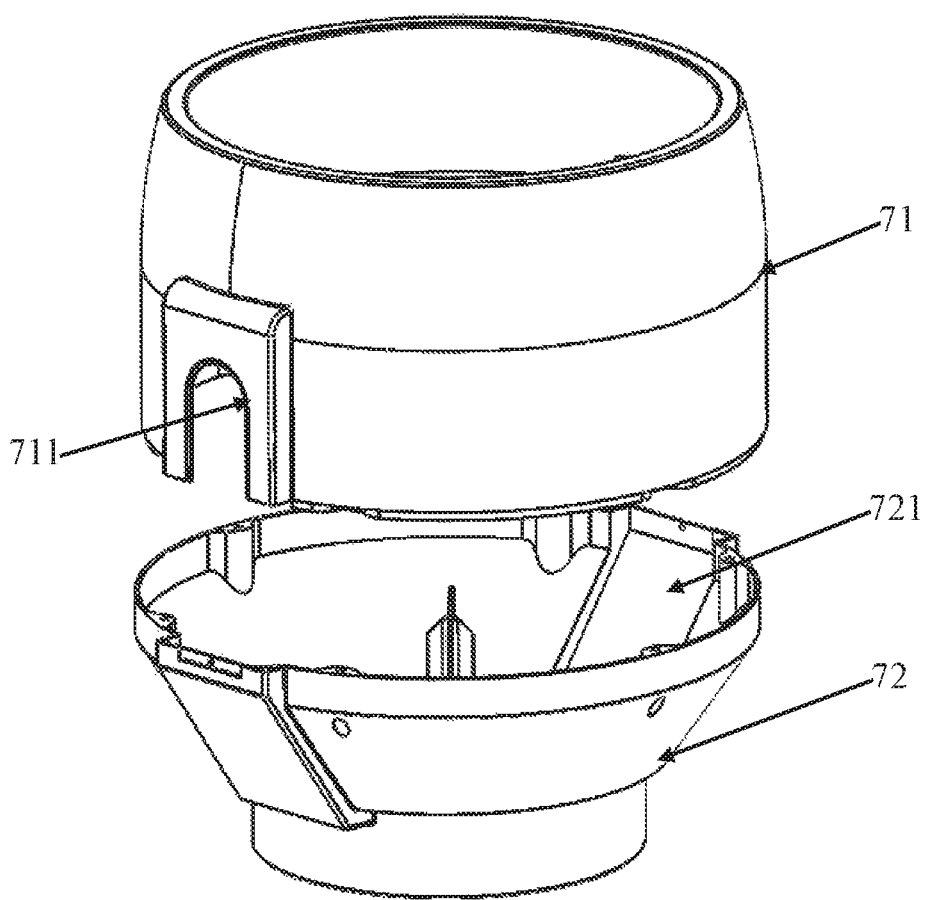
FIG. 13 is an exploded view of a protective shell in an embodiment of the present invention.

As shown in FIGS. 2, 12 and 13, in order to form a sealed space inside the wok assembly device and protect the wok assembly device from being damaged, the wok assembly device in the embodiment further includes a protective shell 7 within which the wok 2, the heating device 3, the bracket 4 and the driving device 5 are all contained; the protective shell 7 includes an upper protective shell 71 and a lower protective shell 72, the bracket 4 includes a bracket body 41 and at least one connecting arm 42 arranged on the bracket body 41, a first inserting part 421 is arranged on an upper portion of each connecting arm 42, at least first inserting opening 711 is formed in the upper protective shell 71, and each first inserting part 421 is inserted into the corresponding first inserting opening 711; a second inserting part 422 is arranged on a lower portion of each connecting arm 42, at least second inserting opening 721 is formed in the lower protective shell 72, and each second inserting part 422 is inserted into the corresponding second inserting opening 721. The upper protective shell 71 and the lower protective shell 72 are connected to the bracket 4 in an inserted manner, so that the bottom portion of the upper protective shell 71 and the top portion of the lower protective shell 72 are attached together, and meanwhile, a sealed space is formed inside the wok assembly device by combination the embedding and matching of the wok 2.

In addition, it should be noted that in an embodiment of the present invention, the connecting arm 42 is V-shaped, the first inserting part 421 is provided on one branch of the connecting arm 42, and the second inserting part 422 is provided on the other branch of the connecting arm 42.

In an embodiment of the invention, the number of the connecting arms 42 can be set according to actual use requirements, such as 1, 2, or 3, etc. In order to enable the upper protective shell 71 and the lower protective shell 72 to be connected to the bracket 4 in an inserted manner securely, preferably, the number of the connecting arms 42 in the embodiment is two, and the two connecting arms 42 are arranged on the bracket body 41 in a circumferential manner; correspondingly, the number of the mounting portions 611 is also two, and the two mounting portions 611 are arranged on the annular base 61 in a circumferential manner so that the annular base 61 can be firmly fixed to the connecting arm 42, and thereby achieving intimate contact of the annular base 61 with the top portion 311 of the inner container 3.

In an embodiment of the present invention, in order to reduce the manufacturing difficulty of the bracket 4 and reduce the cost, preferably, the bracket body 41 and the connecting arm 42 in the embodiment are integrally formed with a sheet metal. Of course, the bracket body 41 and the connecting arm 42 may also be separately formed and then connected together, which is not described herein for further details.

As shown in FIG. 2, in order to rationalize the structure and realize that the heating device 3 is fixedly connected to the bracket 4, the bracket 4 in the embodiment further includes a supporting seat 43, and the outer shell 32 is fixedly connected to the bracket 4 through the supporting seat 43; a fourth through hole 431 is formed in the supporting seat 43, and the first flange 11 sequentially penetrates through the bottom portion of the inner container 31, the bottom portion of the outer shell 32 and the fourth through hole 431. Specifically, a mounting support 432 is arranged on the supporting seat 43, and the supporting seat 43 is fixedly connected to the bracket body 41 through the mounting support 432.

Figure 5:
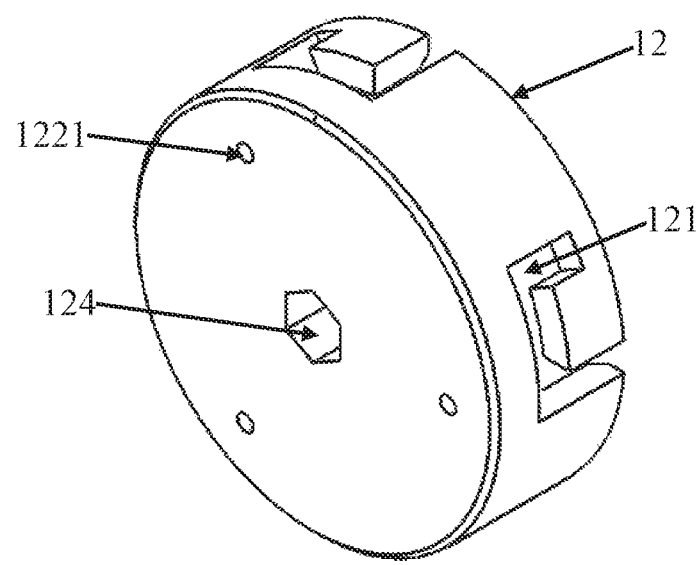
FIG. 5 is a schematic structural view of a second flange in an embodiment of the present invention.
Figure 6:
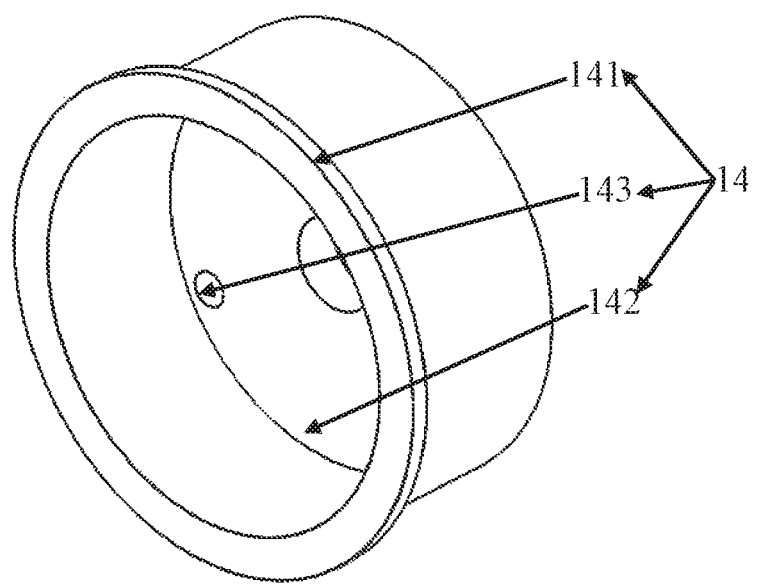
FIG. 6 is a schematic structural view of a pressing spring inner cover in an embodiment of the present invention.
Figure 7:
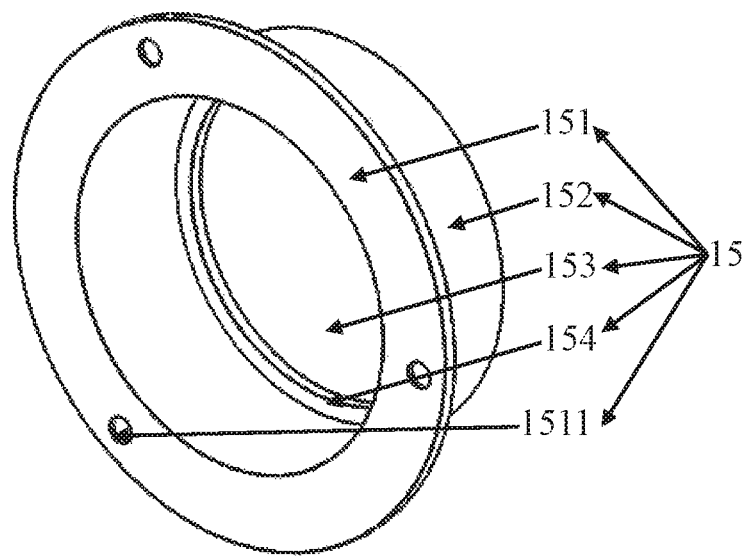
FIG. 7 is a schematic structural view of a pressing spring outer cover in an embodiment of the present invention.
Figure 8:
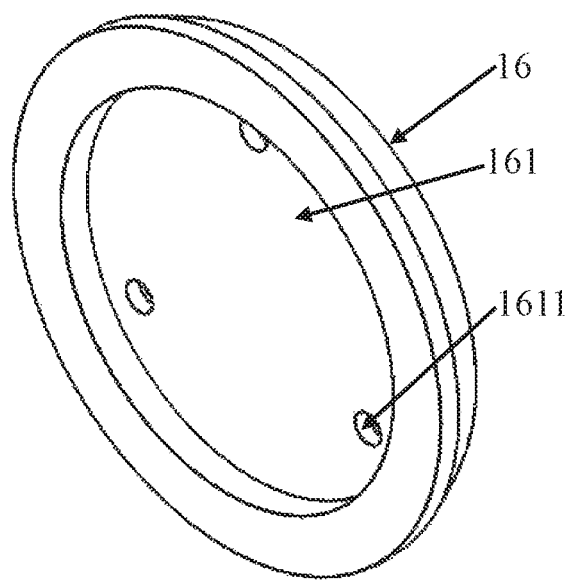
FIG. 8 is a schematic structural view of a guide piece in an embodiment of the present invention.
Figure 9:
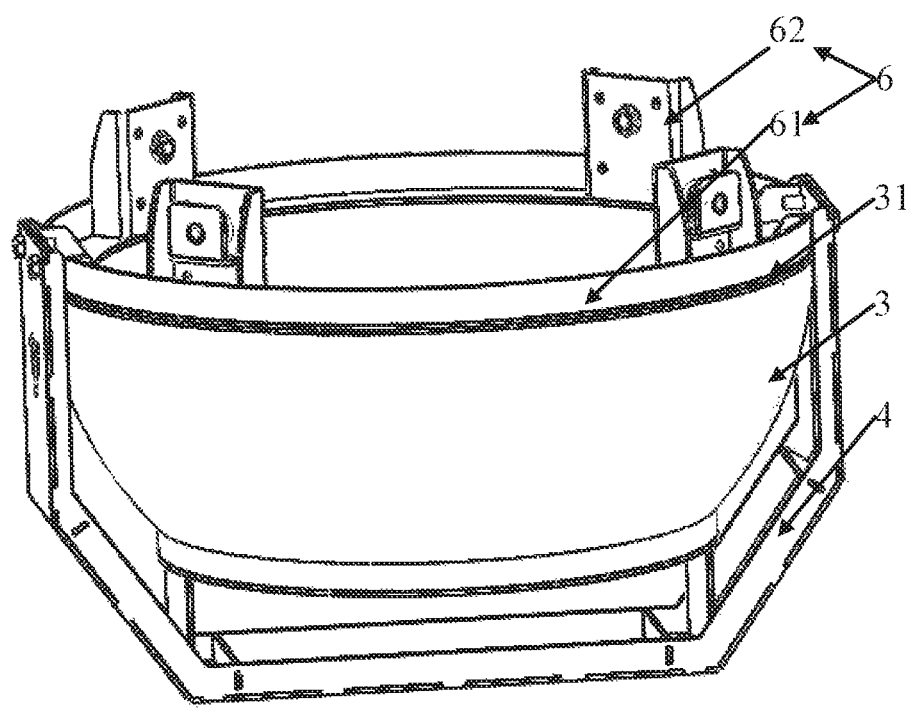
FIG. 9 is a view showing the mating relationship of an annular base, a heating device and a bracket in an embodiment of the present invention.
Figure 10:
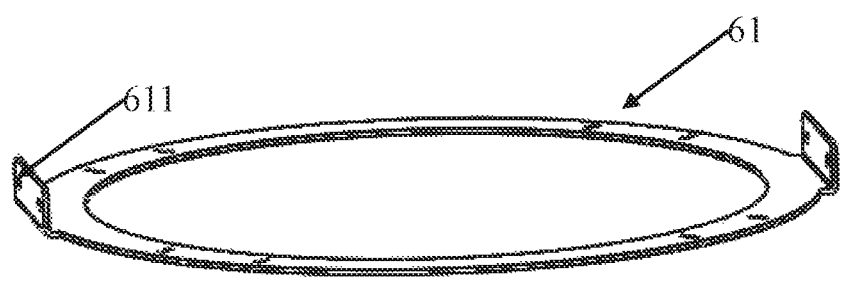
FIG. 10 is a schematic structural view of an annular base in an embodiment of the present invention.
Figure 11:
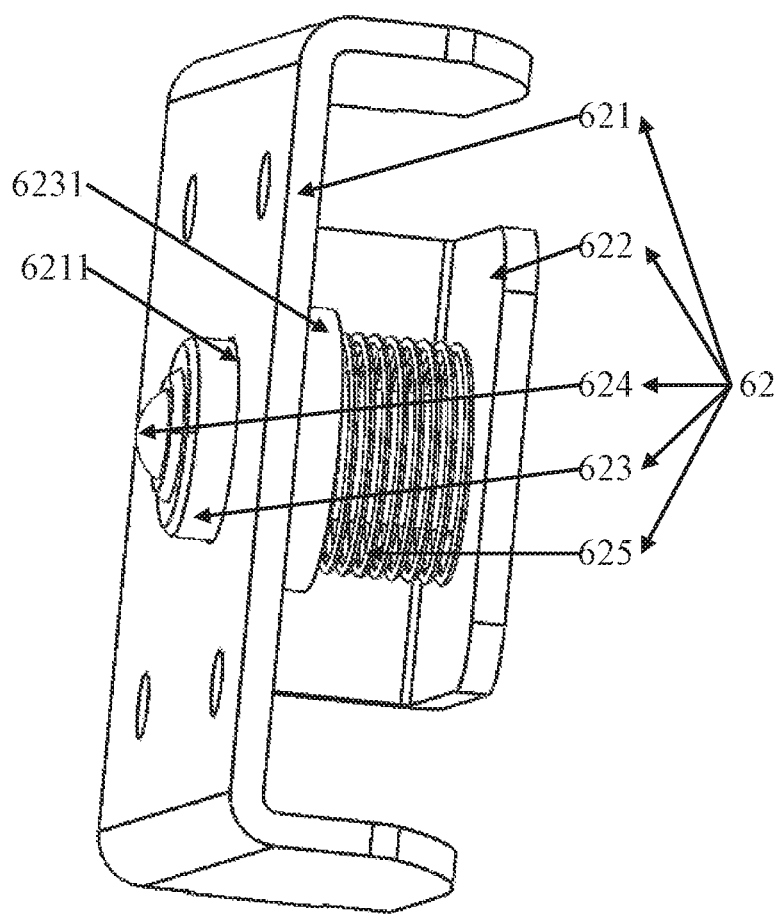
FIG. 11 is a schematic structural view of an resilient supporting device in an embodiment of the present invention.

As shown in FIGS. 2 and 5, in order to rationalize the structure and realize that the second flange 12 is rotatably connected to the driving device 5, the driving device 5 in the embodiment is a motor, a connecting hole 124 is formed in the bottom portion of the second flange 12, and the second flange 12 is rotatably connected to an output shaft of the motor 5 through the connecting hole 124. Moreover, in the embodiment of the invention, in order to improve the driving torque of the motor 5 to the flange assembly 1, the cross section of the connecting hole 124 in the embodiment is hexagonal, and correspondingly, the cross section of the output shaft of the motor 5 is hexagonal; of course, in the embodiment of the invention, the cross section of the connecting hole 124 may also be circular or any other shape as long as the driving torque of the motor 5 to the flange assembly 1 can be improved, which is not described herein for further details.

As shown in FIGS. 1 and 2, in order to achieve flipping of the wok, the wok assembly device in the embodiment further includes a frame (not shown), one connecting arm 42 is rotatably connected to the frame through a first rotating shaft 8, and the other connecting arm 42 is rotatably connected to the frame through a second rotating shaft 9.

Figure 4:
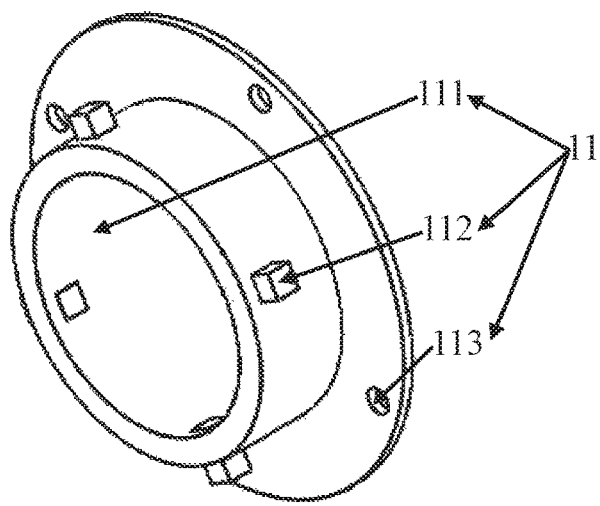
FIG. 4 is a schematic structural view of a first flange in an embodiment of the present invention.
Figure 14:
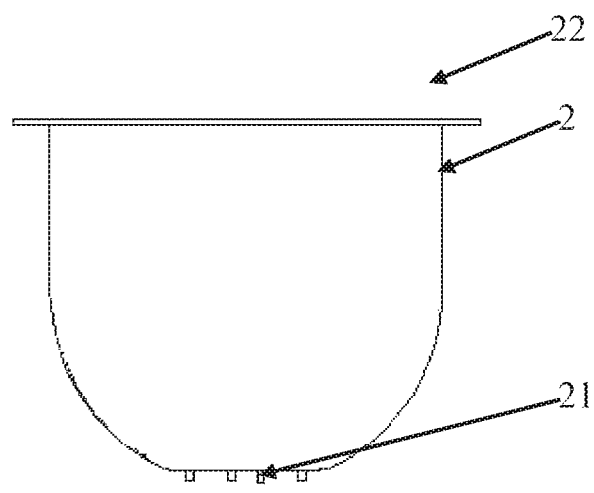
FIG. 14 is a front view of a wok in an embodiment of the present invention.

As shown in FIGS. 2, 4 and 14, in order to rationalize the structure and realize that the first flange 11 is fixedly connected to the bottom portion of the wok 2, the bottom portion of the first flange 11 in the embodiment is provided with at least one mounting hole 113 penetrating through the upper surface and the lower surface of the bottom portion of the first flange 11, the bottom portion of the wok 2 is provided with at least one stud 21, and the stud 21 is detachably connected with the mounting hole 113.

In the embodiment of the present invention, the number of the studs 21 can be set according to actual use requirements, such as 3, 4 or 5, etc. In order to ensure that the first flange 11 is firmly connected to the bottom of the wok 2 and simplify the structure to reduce the cost, preferably, the number of the studs 21 in the embodiment is four, correspondingly, the number of the mounting holes 113 is four, and the studs 21 and the mounting holes 113 are in one-to-one correspondence.

As shown in FIGS. 1 and 14, in order to prevent the wok opening of the wok 2 from scratching a user when the wok of the cooking machine is to be replaced with a new one, a flanging structure 22 is arranged on the wok opening of the wok 2 in the embodiment. In addition, due to the design of the flanging structure 22, garbage and other sundries can be prevented from falling into the sealed space.

Moreover, in the embodiment of the present invention, it should be noted that the flanging structure 22 in the embodiment can adopt an arc structure or a right-angle structure and the size of the flanging structure 22 can be adjusted within a certain range, as long as it can prevent the wok opening of the wok 2 from scratching a user, which is not described herein for further details.

In summary, the wok assembly device in the embodiment of the present invention includes a flange assembly 1, a wok 2, a heating device 3, a bracket 4 and a driving device 5, the heating device 3 includes an inner container 31 and an outer shell 32, and the flange assembly 1 includes a first flange 11 and a second flange 12; the outer shell 32 is fixedly connected to the bracket 4, the inner container 31 is contained in the outer shell 32, and the wok 2 is arranged on the inner container 31; the first flange 11 is connected to a bottom portion of the wok 2, sequentially penetrates through a bottom portion of the inner container 31 and a bottom portion of the outer shell 32 and is detachably connected to the second flange 12; the second flange 12 is rotatably connected to the driving device 5; and the driving device 5 is fixedly connected to the bracket 4. When the wok 2 is to be replaced with a new one, the first flange 11 and the second flange 12 can be quickly detached from each other to separate the wok 2 from the driving device 5, so that the wok 2 can be quickly detached from the driving device 5; and then the first flange 11 and the second flange 12 can be quickly connected to each other to install a new wok 2 on the driving device 5, so that quick replacement of the wok 2 is achieved.

The foregoing descriptions are merely exemplary embodiments of the present invention, and it should be noted that several modifications and substitutions may also be made to those of ordinary skill in the art without departing from the principles of the invention, which should also be considered as a scope of protection of the invention.

What is claimed is:

1. A flange assembly for achieving quick replacement of a wok, comprising a first flange, a second flange and at least one resilient piece; the first flange is fixedly connected to a bottom portion of a wok and detachably connected to the second flange in a clamped manner, and the second flange is rotatably connected to a driving device; the first flange is provided with a first through hole penetrating through an upper surface and a lower surface thereof, the second flange is provided with a first accommodating groove, a bottom portion of the first accommodating groove is provided with at least one positioning pin, and the at least one resilient piece is arranged on the at least one positioning pin in a sleeving manner;

when the first flange is connected to the second flange in a clamped manner to quickly install the wok on the driving device, one end of each resilient piece penetrates through the first through hole and abuts against the bottom portion of the wok, and an other end of each resilient piece abuts against the bottom portion of the first accommodating groove; and when the wok is to be replaced with a new one, the first flange can be quickly detached from the second flange to separate the wok from the driving device.

2. The flange assembly according to claim 1, wherein at least one clamping pin is arranged on a side face of the first flange, at least one bayonet is arranged on a side face of the second flange, and the at least one clamping pin is connected with the at least one bayonet in a clamped manner; or
　at least one bayonet is formed in a side face of the first flange, at least one clamping pin is arranged on a side face of the second flange, and the at least one clamping pin is connected with the at least one bayonet in a clamped manner.

3. The flange assembly according to claim 2, wherein each bayonet is U-shaped; one end of each bayonet is a sealing port, the other end of each bayonet is an open port, and a certain vertical distance is kept between the sealing port and the open port of each bayonet;
　the clamping pin enters the bayonet from the open port of the bayonet and then is clamped on the sealing port of the bayonet along with the rotation of the wok.

4. The flange assembly according to claim 3, wherein the at least one clamping pin is 3, 4 or 5 in number and arranged circumferentially on a side face of the first/second flange, the at least one bayonet is 3, 4 or 5 in number and arranged circumferentially on a side face of the second/first flange, the at least one clamping pin and at least one bayonet are in one-to-one correspondence.

5. The flange assembly according to claim 1, further comprising a pressing spring inner cover and a pressing spring outer cover; the pressing spring outer cover is fixedly connected to the first accommodating groove of the second flange and provided with a second through hole penetrating through an upper surface and a lower surface thereof, the pressing spring outer cover is arranged on the pressing spring inner cover through the second through hole in a sleeving manner, and the pressing spring inner cover cannot separate from the pressing spring outer cover; when the first flange is connected to the second flange in a clamped manner, each resilient piece applies an upward supporting force to the pressing spring inner cover, so that the pressing spring inner cover abuts against the bottom portion of the wok to support the wok.

6. The flange assembly according to claim 5, wherein an outer wall of the pressing spring inner cover is provided with a first annular flange, the pressing spring inner cover is further provided with a second accommodating groove, the pressing spring outer cover comprises a base and a first boss arranged on the base, and an inner wall of the second through hole is provided with a second annular flange; the pressing spring inner cover is arranged on the at least one first resilient piece through the second accommodating groove in a covering manner, the first annular flange is disposed opposite to and below the second annular flange, and the pressing spring outer cover is fixedly connected to a bottom portion of the first accommodating groove through the base; when the first flange is connected to the second flange in a clamped manner, one end of each first resilient piece abuts against the bottom portion of the wok via a bottom portion of the second accommodating groove.

7. The flange assembly according to claim 5, further comprising a guide piece, the guide piece is provided with a third accommodating groove, and the guide piece is arranged on and connected to the pressing spring inner cover through the third accommodating groove in a sleeving manner;
　a side wall of the guide piece contacts with a side wall of the first through hole to guide the pressing spring inner cover into the first through hole.

8. A wok assembly device, comprising a wok, a heating device, a bracket, a driving device and the flange assembly according to claim 1; the heating device comprises an inner container and an outer shell; the outer shell is fixedly connected to the bracket, the inner container is contained in the outer shell, and the wok is arranged on the inner container; the first flange is connected to a bottom portion of the wok, sequentially penetrates through a bottom portion of the inner container and a bottom portion of the outer shell and is detachably connected to the second flange; and the driving device is fixedly connected to the bracket.

9. The wok assembly device according to claim 8, wherein at least one clamping pin is arranged on a side face of the first flange, at least one bayonet is arranged on a side face of the second flange, and the at least one clamping pin is connected with the at least one bayonet in a clamped manner; or
　at least one bayonet is formed in a side face of the first flange, at least one clamping pin is arranged on a side face of the second flange, and the at least one clamping pin is connected with the at least one bayonet in a clamped manner.

10. The wok assembly device according to claim 9, wherein each bayonet is U-shaped; one end of each bayonet is a sealing port, the other end of each bayonet is an open port, and a certain vertical distance is kept between the sealing port and the open port of each bayonet;
　the clamping pin enters the bayonet from the open port of the bayonet and then is clamped on the sealing port of the bayonet along with the rotation of the wok.

11. The wok assembly device according to claim 10, wherein the at least one clamping pin is 3, 4 or 5 in number and arranged circumferentially on a side face of the first/second flange, the at least one bayonet is 3, 4 or 5 in number and arranged circumferentially on a side face of the second/first flange, the at least one clamping pin and at least one bayonet are in one-to-one correspondence.

12. The wok assembly device according to claim 8, wherein the flange assembly further comprising a pressing spring inner cover and a pressing spring outer cover; the pressing spring outer cover is fixedly connected to the first accommodating groove of the second flange and provided with a second through hole penetrating through an upper surface and a lower surface thereof, the pressing spring outer cover is arranged on the pressing spring inner cover through the second through hole in a sleeving manner, and the pressing spring inner cover cannot separate from the pressing spring outer cover; when the first flange is connected to the second flange in a clamped manner, each resilient piece applies an upward supporting force to the pressing spring inner cover, so that the pressing spring inner cover abuts against the bottom portion of the wok to support the wok.

13. The wok assembly device according to claim 12, wherein an outer wall of the pressing spring inner cover is provided with a first annular flange, the pressing spring inner cover is further provided with a second accommodating groove, the pressing spring outer cover comprises a base and a first boss arranged on the base, and an inner wall of the second through hole is provided with a second annular flange; the pressing spring inner cover is arranged on the at least one resilient piece through the second accommodating groove in a covering manner, the first annular flange is disposed opposite to and below the second annular flange, and the pressing spring outer cover is fixedly connected to a bottom portion of the first accommodating groove through the base; when the first flange is connected to the second flange in a clamped manner, one end of each first resilient piece abuts against the bottom portion of the wok via a bottom portion of the second accommodating groove.

14. The wok assembly device according to claim 12, wherein the flange assembly further comprises a guide piece, the guide piece is provided with a third accommodating groove, and the guide piece is arranged on and connected to the pressing spring inner cover through the third accommodating groove in a sleeving manner;

a side wall of the guide piece contacts with a side wall of the first through hole to guide the pressing spring inner cover into the first through hole.

15. The wok assembly device according to claim 8, further comprising a resilient supporting device, the resilient supporting device comprises an annular base and a plurality of resilient supporting structures evenly distributed on the annular base; the annular base is in contact with a top portion of the inner container, the annular base is provided with at least one mounting portion, and the annular base is fixedly connected to the bracket through the at least one mounting portion; wherein each of the plurality of resilient supporting structures comprises a mounting seat, a pressing piece, a top shaft, a top bead and a second resilient piece, a third through hole is formed in the mounting seat, one end of the top shaft is fixedly connected to the pressing piece, the other end of the top shaft penetrates through the third through hole, a second boss is arranged on a side face of the top shaft, the second resilient piece is arranged on the top shaft in a sleeving manner, one end of the second resilient piece abuts against the pressing piece, the other end of the second resilient piece abuts against one end of the second boss, the other end of the second boss abuts against the mounting seat, the pressing piece is fixedly connected to the mounting seat, the top bead is fixedly connected to the other end of the top shaft, and each of the plurality of the resilient supporting structure is fixedly connected to the annular base through the mounting seat; when the wok is placed on the heating device, each top bead abuts against an outer side wall of the wok.

16. The wok assembly device according to claim 8 further comprising a protective shell, and the wok, the heating device, the bracket and the driving device are all contained in the protective shell; the protective shell comprises an upper protective shell and a lower protective shell, the bracket comprises a bracket body and at least one connecting arm arranged on the bracket body, a first inserting part is arranged at an upper portion of each connecting arm, at least one first inserting opening is formed in the upper protective shell, and each first inserting opening is inserted by the first inserting part; a second inserting part is arranged at a lower portion of each connecting arm, at least one second inserting opening is formed in the lower protective shell, and each second inserting opening is inserted by the second inserting part.

17. The wok assembly device according to claim 8, wherein the bracket further comprises a supporting seat, and the outer shell is fixedly connected to the bracket through the supporting seat; a fourth through hole is formed in the supporting seat, and the first flange sequentially penetrates through the bottom portion of the inner container, the bottom portion of the outer shell and the fourth through hole.

18. The wok assembly device according to claim 15, wherein the plurality of resilient supporting structures are 3, 4 or 5 in number and arranged circumferentially on a side face of the annular base.

19. The wok assembly device according to claim 16, wherein a flanging structure is arranged on a wok opening of the wok, and the flanging structure is an arc structure or a right-angle structure; the upper protective shell and the lower protective shell are connected to the bracket in an inserted manner, so that the bottom portion of the upper protective shell and a top portion of the lower protective shell are attached together, and meanwhile, a sealed space is formed inside the wok assembly device by combination an embedding and matching of the wok.

20. The wok assembly device according to claim 16, wherein each connecting arm is V-shaped, the first inserting part and the second inserting part are respectively provided on two branchs of the each connecting arm;

the at least one connecting arm is 2 in number and arranged on the bracket body in a circumferential manner;

the bracket body and the at least one connecting arm are integrally formed.

\* \* \* \* \*